Sept. 7, 1937. P. E. TARLTON 2,092,267
FRUIT MARKING MACHINE
Filed Jan. 23, 1935 4 Sheets-Sheet 3
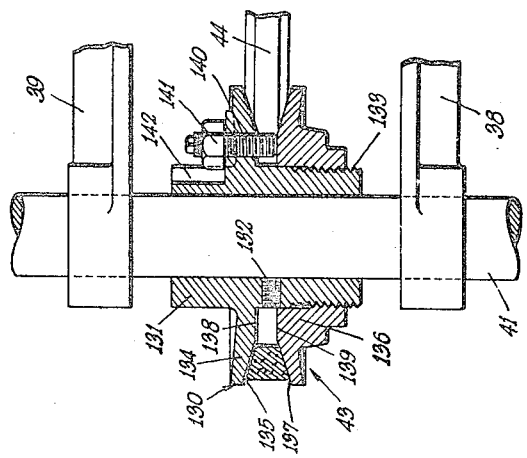
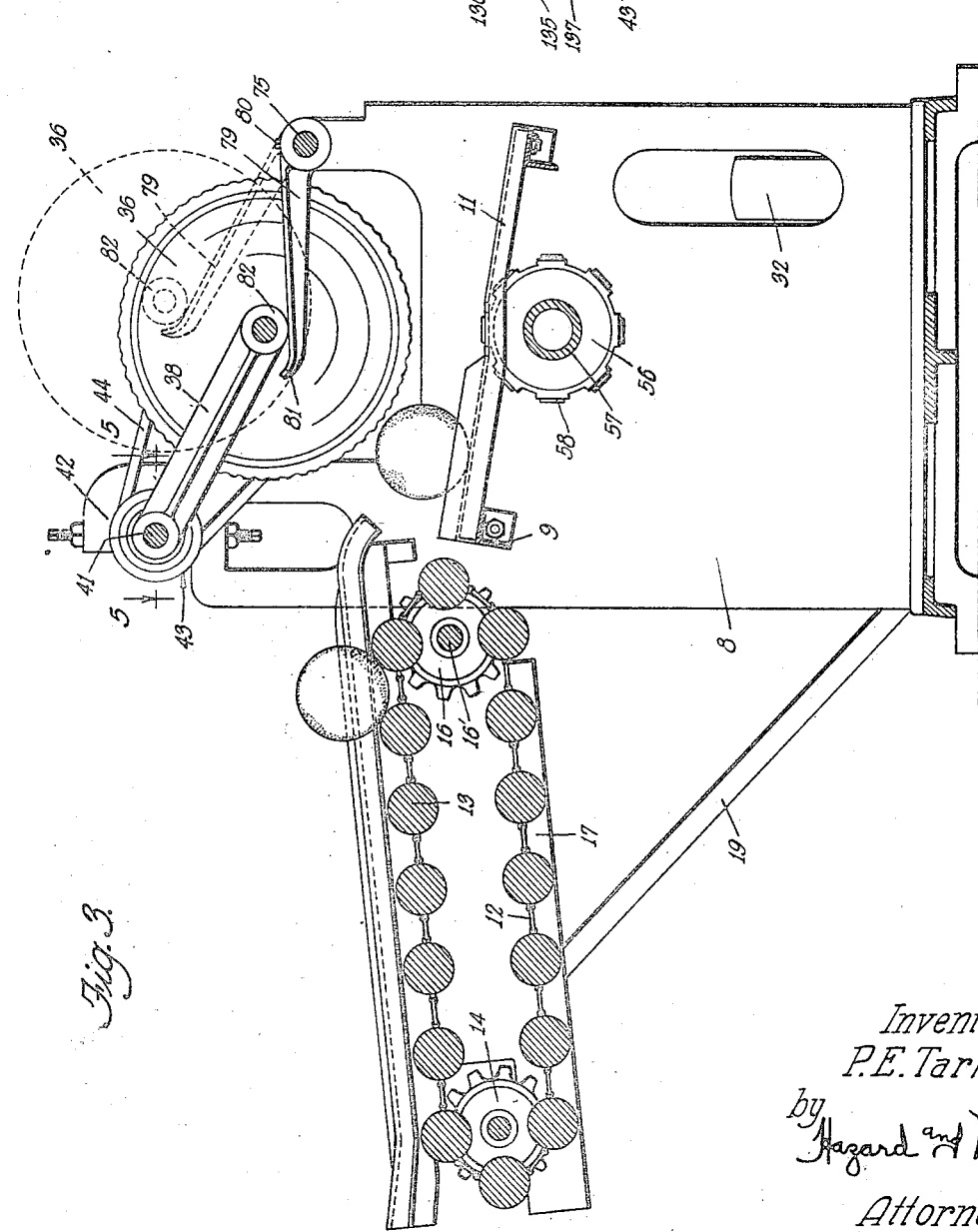
Inventor
P. E. Tarlton
by Hazard and Miller
Attorneys.

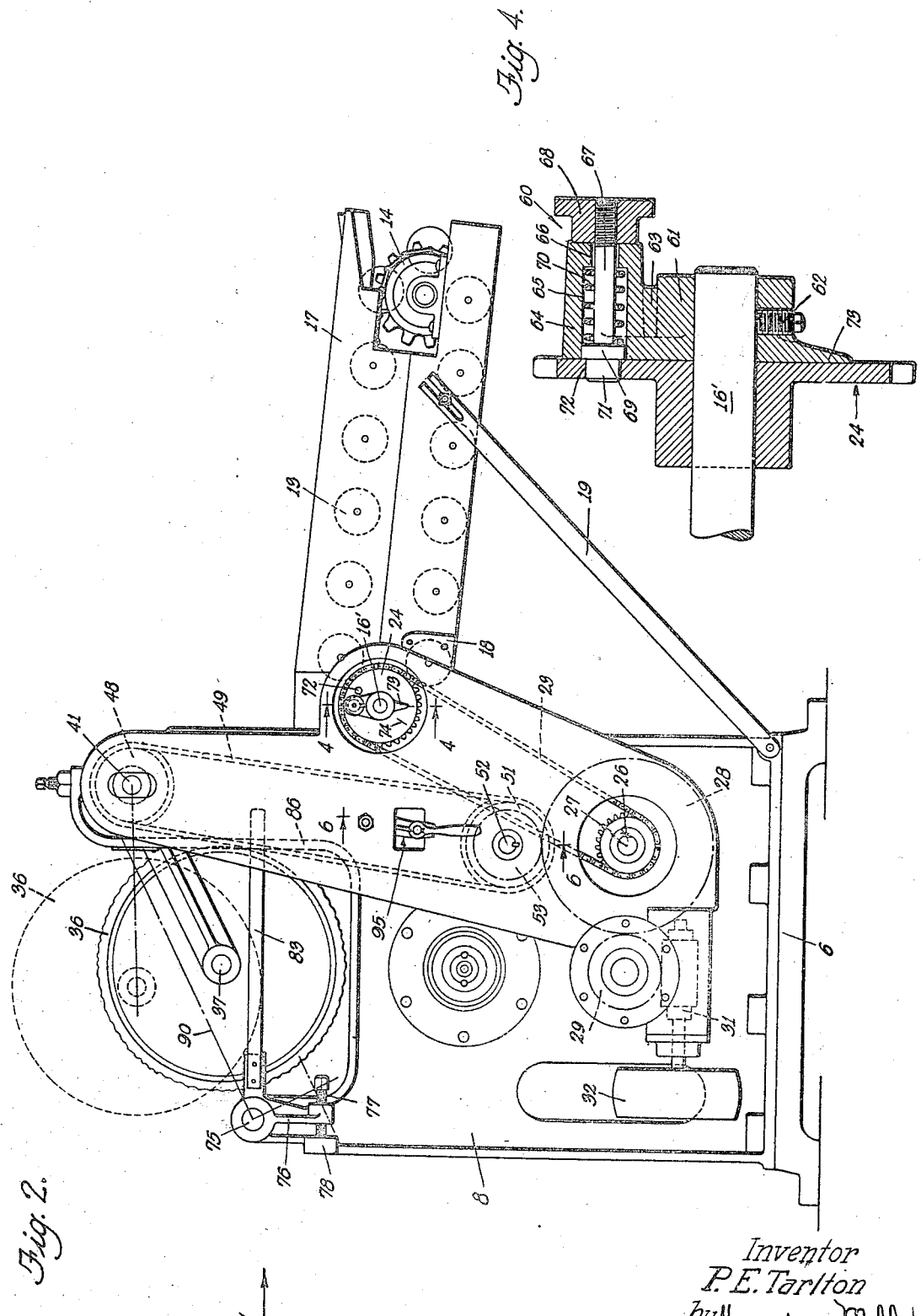

Sept. 7, 1937.   P. E. TARLTON   2,092,267
FRUIT MARKING MACHINE
Filed Jan. 23, 1935   4 Sheets-Sheet 4
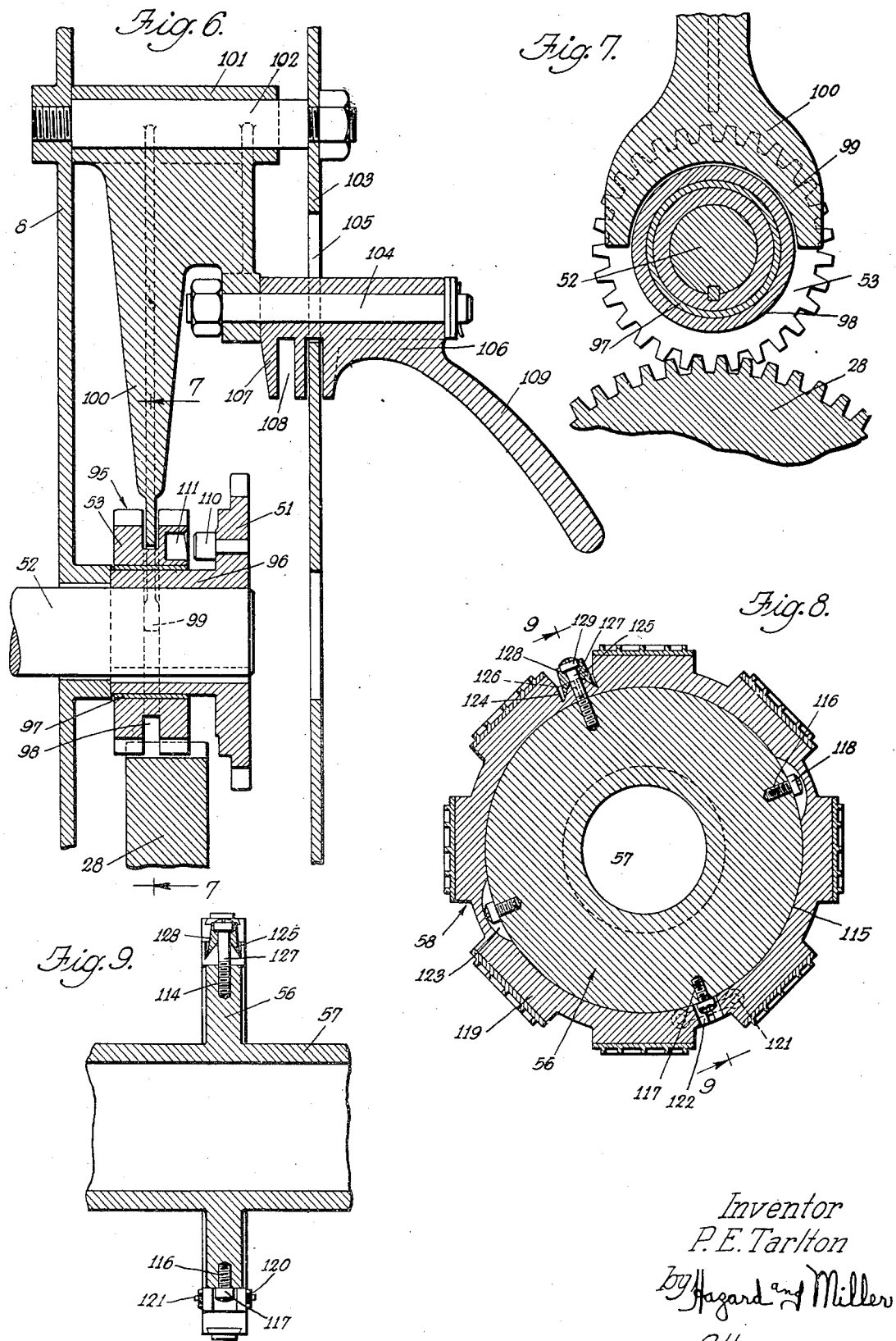
Inventor
P. E. Tarlton
by Hazard and Miller
Attorneys.

Patented Sept. 7, 1937

2,092,267

UNITED STATES PATENT OFFICE 2,092,267

FRUIT MARKING MACHINE

Perle Everett Tarlton, Los Angeles, Calif., assignor to Electric Fruit Marking Co., Los Angeles, Calif., a corporation of California Application January 23, 1935, Serial No. 3,051

4 Claims. (Cl. 101—378)

My present invention is embodied in a fruit marking machine of the type illustrated and described in my prior United States patent for fruit marking machine No. 1,926,356 patented September 12, 1933. In this machine there is a fruit conveyor which is in the form of a pair of parallel chains having rollers attached thereto which rollers convey the fruit up a slight incline and then discharge the fruit for its further progress through the fruit marking machine. The machine of the patent, however, does not have any way of adjusting the conveyor of the fruit in reference to the fruit marking elements of the machine to compensate for differences of feed between large and small size fruit.

Therefore, one of the objects and features of my invention is an arrangement for changing the relative positions of the endless chain conveyor and the other parts of the fruit marking machine. In order to develop a differential feed for large and small size fruit the time of discharge of the fruit is varied in its relation to the active elements which cooperate to mark the fruit. This is done by having a disconnectible latch between a drive sprocket for the endless conveyor and the shaft of such conveyor whereby the shaft and the drive sprocket may be fixedly connected together in a plurality of different relative angular positions whereby a slight change in the timing of the discharge of fruit from the conveyor may be obtained in relation to the active elements which cooperate to mark the fruit such as the time marking dies and the fruit impeller wheels of the patent.

In the patent the impeller wheels which are of large diameter and have suitable resilient treads for feeding the fruit and present this against the intermittently operated marking die, may be adjusted in a vertical plane to vary the pressure on the fruit. However, in some cases, it is desirable to pass a batch of fruit through the machine without having any marking thereon. There is no provision in the patent for this.

Therefore, another object and feature of my invention is a device for raising and also to allow lowering of the impeller wheels, these being mounted each on pivoted arms, each pair of arms having its wheel. I employ, in this connection, a pivoted rock shaft having arms or fingers which engage each pair of arms for the impeller wheels and thus may raise or lower such wheels, and in order to lock this rock in an elevated position, I employ a lever arm connected to the rock shaft, which lever arm may be latched in an elevated position and thus, by means of the arm on the rock shaft, the impeller wheels may be raised out of operative drive connection with the fruit.

Another detailed feature of my invention in relation to the drive for the impeller wheels relates to the construction of the pulleys on a common drive shaft over which operates a V-type of belt. This same pulley shaft forms the mounting for the pivoted arms, each pair of which journal an impeller wheel, and each impeller wheel is, in the patent, driven by a V-type belt from its drive pulley. The improvement in the drive pulley consists of forming this in two adjustable parts so that the distance between the sides of the V may be regulated, that is, either tightened or loosened and held in adjusted relationship. In order to obtain this adjustment the pulley is made in two sections, one with a hub on the shaft, such hub being screw-threaded, and has a fixed converging flange forming one of the faces of the pulley. The other section of the pulley is threaded on the hub and has a complementary flange to engage the opposite side of the V belt. These two sections of the pulley may therefore be adjusted in an axial direction of the shaft and held in the adjusted position. This is simply regulated by providing limiting screws which prevent an excess tightening or narrowing of the space in the pulley. The direction of drive tends to maintain the two faces of the pulley in correct adjustment.

In the patent above mentioned there is an intermittent drive for the printing dies for marking the fruit, these being mounted on a die wheel, and in addition, there is an intermittently operated inking ribbon. With my present improvement for passing the fruit through the machine without marking there is no necessity for intermittently rotating the die wheels and also for operating the inking ribbon. Therefore, one of my present improvements is in a specific gear drive in which one of two present meshing gears is arranged to have a sliding movement and thereby in cooperation with a plug type of clutch on a sprocket wheel, forming an open or a closed drive between this sprocket wheel and the gear train. Thus, when the clutch is open there is no interconnected drive between the sprocket wheel and the gear train, but when the clutch is closed, this drive takes place.

This specific improvement employs a sprocket keyed on a shaft and having a plug on one side facing towards a gear slidably mounted on the hub on the sprocket. This gear has a socket in its face to receive the plug on the sprocket and is provided with a reduced neck, this neck being engaged by a yoke of the slidable clutch arm.

A further detailed feature of the gear shaft comprises slidably mounting the yoke arm on a stud, or the like, and providing a handle which is rotatably mounted on a pin. This handle has a pair of notches either of which may be engaged in a cover plate, such cover plate having an opening through which the handle extends, and therefore the gear is either positioned in an open or closed relation to its associated sprocket.

In the patent above mentioned the printing dies for marking the fruit are formed in half segments and attached to the periphery of the die wheels. This requires a plurality of screws to attach each half section of the semi-circular die.

My present invention relates to an improvement in the dies and their attachment to the die wheel in providing the dies in semi-circular sections hinged or pivoted together at one side by a link. The die wheel has a plurality of studs or screws permanently attached thereto for centering purposes and to drive the dies without slippage, one of which studs extends through a recess at the link connected end of the dies. The dies on their under face have cut-out notches to receive the other screws or studs on the die wheel. The two free ends of the dies are pulled together by wedging type of washer held in place by a screw which extends radially in the die wheel. By this construction the dies may be quickly changed when a different die marking is required on the fruit.

As above mentioned, my present improvements are embodied in a machine similar to that of my Patent No. 1,926,356, omitting features which do not enter into the present improvements and also showing in detail such improvements. Therefore, in the drawings:

Fig. 2 is a side elevation taken in the direction of the arrow 2 of Fig. 1.

Fig. 3 is a vertical longitudinal section on the line 3—3 of Fig. 1 taken in the direction of the arrows.

Fig. 4 is a detailed transverse section on the line 4—4 of Fig. 2 in the direction of the arrows showing the arrangement for changing the timing between the conveyor feed for the fruit and the marking portion of the machine.

Fig. 5 is a detail transverse section on the line 5—5 of Fig. 3 taken in the direction of the arrows showing the construction of the adjustable drive pulley for operating the impeller wheel.

Fig. 6 is a detail transverse section on the line 6—6 of Fig. 2 taken in the direction of the arrows showing the clutch in a gear train between a gear and a sprocket on a shaft which latter operates the intermittent feed for the marking dies and other features of my present machine.

Fig. 7 is a detail longitudinal section of Fig. 6 on the line 7—7 taken in the direction of the arrows.

Fig. 8 is a detail longitudinal section which may be considered as on the line 8—8 of Fig. 1 in the direction of the arrows through a die wheel and the removable dies thereon.

Fig. 9 is a detail transverse section on the line 9—9 of Fig. 8 in the direction of the arrows.

In the following description the same numerals are used as in my patent above mentioned to identify similar elements of construction, although I may have, in the present invention, modified the details of such elements and designate such details by additional reference numerals.

Figure 1:
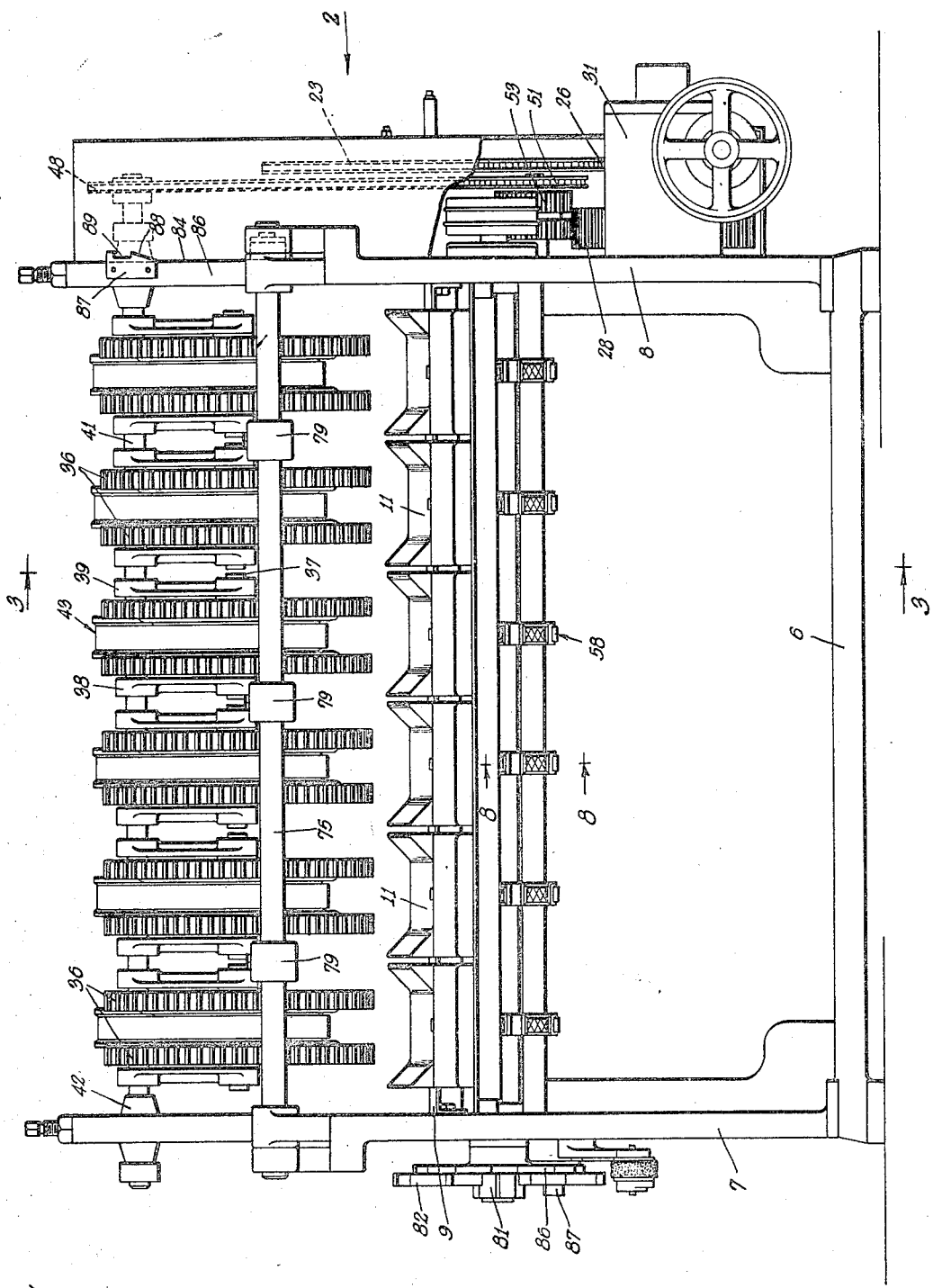
Fig. 1 is an end elevation of the machine taken in the direction of the arrow 1 of Fig. 2 wherein parts not essential to the present improvements are omitted.

The machine is provided with a base 6 extending upwardly, from which there arise end plates 7 and 8. A suitable sub-frame 9, which is supported on the end plates 7 and 8 carries a plurality of run-ways 11, each of which is adapted to receive and carry the fruit to be marked.

For feeding the fruit to the runways 11 I employ a pair of parallel chains 12 which have a plurality of rollers 13 and thus form an endless conveyor. The chains and rollers operate over sprockets 14 and 16, these being rotatably mounted in a conveyor frame 17 secured to the end plates 7 and 8 by brackets 18 and braces 19. The brackets may be adjustable in the manner described in my above mentioned patent, and similar provision made to tighten or loosen a driving chain 23 connecting over a sprocket 24 on the shaft designated herein 16' driving the sprockets 16. The chain also operates over a sprocket 26 on a stub shaft 27 mounted on the end plate 8. Mounted for rotation with the sprocket 26 is a gear 28 meshing with a gear 29 driven by a speed reducer 31 which receives its driving force from a pulley 32 connected to any suitable source of power (not shown).

The fruit when deposited by the endless conveyor is discharged on the runway 11. It rolls downwardly by gravity. To assist this action and to positively impel the fruit there is situated above each runway 11 an impeller wheel 36, each mounted on an axle 37. Each axle is held by a pair of arms 38 and 39, each of which is freely mounted for pivotal movement on a common shaft 41 carried in bearings 42 mounted on the end plates 7 and 8, these bearings being adjustable. The shaft 41 has a plurality of pulleys 43 around each of which passes a V type of driving belt 44. Each belt drives one of the impeller wheels 36. These impeller wheels may be provided with resilient tires for engaging the fruit and a groove between the tires to accommodate the driving belt 44.

The shaft 41 at its extremity carries a sprocket 48 over which operates a chain 49 extending to a sprocket 51 secured to a transverse shaft 52 which extends entirely across the machine and is journalled in the end plates 7 and 8. Also mounted on the hollow shaft 52 is a gear 53 meshing with the gear 28 on the stop shaft 27 so that when the mechanism is operated, the wheels 36 are rotated in an appropriate direction to propel the fruit along the runways 11.

A suitable mark is impressed on the fruit by employing die wheels 56 mounted on a tube 57, this tube being journalled in the end plates 7 and 8, and each die wheel carries at its periphery a plurality of dies 58. These dies may be inked and rotated in a step by step manner by mechanism similar to that described in my patent above mentioned. However, the details of the inking and the intermittent movement of the die wheels do not form part of my present invention.

The intermittent drive for the shaft 57 having the die wheels is through a toothed wheel 81 (note Fig. 1) on the end of the shaft 57. This has spaced teeth 82 forming channels between the teeth, and in these channels operates the roller 87 which is attached to an arm 86, this latter arm being secured to the shaft 52. Therefore, the rotation of this shaft 52 with its arm 86 gives the intermittent rotation to the shaft 57 having the die wheels, in the manner described in my patent above mentioned.

Certain features of my improvements on the machine above described and identified are as follows: The timing device to regulate the endless fruit conveyor is as detailed below, having reference particularly to Figs. 2 and 4.

In this case, a disconnecting latch designated by the assembly numeral 60 employs a latch disk 61 in the form of a hub which is attached to the shaft 16 preferably by a set screw 62. From this disk there is a short arm 63 with a boss 64 at the end, such boss having a recess 65 and a guide perforation 66 in its base. A stem 67 extends through this to the guide perforation 66 and has a finger grip knob 68 on its exposed end and a guide head 69 in the recess 65. A compression spring 70 is fitted between the head 69 and the base of the recess tending to force the head 69 outwardly, and from this head there is attached a plug 71 which is attached to fit in any one of the perforations 72 in the sprocket wheel 24, which sprocket, instead of being keyed or otherwise rigidly secured to the shaft 16' carrying the sprocket 16, is loose thereon so that it may rotate on such shaft. Extending from the disk 61 there is a pointer finger 73 which may be aligned with any one of the indicia marks 74 on the face of the gear 24.

The manner of operating the timing latching device is as follows:

The sprocket 24 is connected by the sprocket chain 23 with the sprocket 26 on the shaft 27 and hence operates in conjunction with the gear 53 and gear 28 and the other parts of the drive with the propeller wheels 36 and the intermittently operated die wheels 56. Therefore, when it is desired to change the timing the hand grip knob 68 may be pulled outwardly thus removing the plug 71 from one of the perforations 72 in the gear 24, then the disk 61 and the shaft 16' carrying the sprocket 16 may be slightly rotated and the plug 71 fitted in one of the other perforations 72. In the illustration of Fig. 2 there are only two of these perforations shown, but, manifestly, others may be used. This rotating movement of the shaft 16' will either cause a forward or relatively backward movement of the upper run of the conveyor chains 12 and thus cause a slight change in the timing as to the discharge of fruit from the conveyor in reference to the intermittently operated die wheels and the associated mechanism therefor. Hence, with my present improvement I may obtain a better regulation of the feeding of the fruit of different sizes to the marking part of the mechanism.

The device for raising and lowering the impeller wheels to bring such wheels out of operative contact with the fruit is as follows having reference particularly to Figs. 1, 2 and 3:

As above mentioned, the impeller wheels 36 are carried by arms 38 and 39 rotatable on shaft 41, and each of these wheels rotates on a shaft 37 journalled in the ends of the arms 38. The lifting mechanism employs a rock shaft 75 which is journalled in the end plates 7 and 8. This shaft has a regulating arm 76 attached thereto at one end and through this arm extends a regulating screw 77 which is adapted to contact an abutment 78 on the end plate 8 and thus regulate the position of the rock shaft 75. This rock shaft has a plurality of fingers 79 attached thereto as by the set screws 80. Each finger has a slightly upturned tip 81 and each finger bears on the hub 82 at the end of a pair of the arms 38 and 39. Thus, by adjusting the adjusting screw 77 the arms 38 and 39 and hence the impeller wheels 36 may be held, when operative, at the correct elevation or height above the die wheels 56 and off the runways 11.

The device for elevating the impeller wheels to an inoperative position employs a lever arm 83 attached to the rock shaft 75 preferably by securing this to a portion of the arm 76. This lever arm is formed of resilient material and its end is adapted to contact the face 84 of the upper portion of the end plate 8. The vertical edge 86 which is provided with a latching plate 87 has a sloping cam surface 88 and a notch 89, which notch engages the outer or free end of the lever arm 83 and holds this in an upwardly inclined position as indicated by the dotted line 90 of Fig. 2. This causes a rocking of the shaft 75 in such a direction as to elevate the fingers 79 from the full line position and thus raise the impeller wheels to such a height that they are out of contact with any fruit that may feed down the runways 11. This allows the fruit to run through the machine without being marked by the die wheels and the dies thereon. However, as it is not desirable to rotate the propeller wheels or to intermittently turn the die wheels and to operate the inking mechanism, I employ a cut-off drive connection for these elements of the machine.

This cut-out employs a drive clutch assembly designated by the numeral 95. Note particularly Figs. 2, 6 and 7. As above described and as used in my patent above mentioned, the shaft 52 which extends transversely across the machine has both a gear 53 and a sprocket 51 attached thereto. In the present arrangement the sprocket 51 has a hub 96, which hub is keyed to the shaft 52. The gear 53 is slidably mounted on this hub having preferably a bushing 97. The gear 53 is also provided with a contracted neck 98, this being cut at about the center of the face of the teeth so that the arms 99 of a yoke arm 100 may engage in this neck for sliding the gear 53 longitudinally on the hub 96. The teeth on the gears 28 and 53 are made of such a length that they will always be in mesh. The yoke arm 100 has a hub 101 slidably mounted on a stud 102. This stud is secured to the end plate 8 of the frame of the machine and also to a cover plate 103 which encloses the various gears, or the like. A pin 104 is attached to the yoke arm and projects through an opening 105 in the plate 103. On this pin there is a handle 106 having an offset section 107 with a pair of notches 108 therein. The handle also has a hand grip end 109. Therefore, by rotating the handle on the pin 104 a notch may be engaged with or disengaged from the plate 103. When the notch 108 is so disengaged the yoke arm may be moved longitudinally on the stud 102. This lateral moving action causes a stud 110 secured to the sprocket 51 to enter a driving recess 111 in the gear 53. This recess is tapered at one end so that in the direction of relative movement of the sprocket 51 and the gear 53 the stud enters such recess and this takes up the drive with the gear 53. The slots 108 of the handle then secure the gear either in driving, that is, closed, or in non-driven, that is, open relation with the clutch assembly on the shaft 52.

Hence, when this clutch is closed, the drive of the impeller wheels and the intermittent motion of the die wheels is developed in a manner similar to my patent above mentioned but when the clutch is opened, these elements remain stationary, the gear 53 rotating in an idle manner.

As it is necessary to change the printing dies on the die wheels 96 sometimes quite often in a day's work I provide a simpler construction than in my above mentioned patent. The improved removable dies are illustrated in detail in Figs. 8 and 9. The periphery 115 of the die wheel 56 is cylindrical and is provided with a plurality of preferably the equally spaced threaded sockets 116, these being illustrated as four in number. In three of these there is a stud 117 threaded in place, the heads 118 of these studs projecting. The dies 58 are illustrated as formed in two semi-circular sections 119, these being connected by a pair of links 120 attached by pins 121 to the half sections of the die. This allows the dies to have a hinged action and to be spread apart at the link. The ends of the half dies 119 have a radial notch 122 which accommodates the head 118 of one of the bolts. In the construction illustrated there is a single recess 123 in each of the half sections which each accommodate the head of one of the bolts 117. These bolts therefore prevent the die from slipping or being thrust laterally off the cylindrical surface 115 of the die wheel. The ends 124 of each of the half dies are constructed with a semi-coned recess 125 and each end has a substantially radial groove 126. These pairs of grooves accommodate a bolt 127 threaded in one of the threaded sockets 114. The bolt passes through a washer 128 which has a conical inside surface engaging the coned recesses 125. The head 129 of the bolt fits in a shallow recess in the washer. Therefore, when the bolt 127 is tightened the washer is jammed downwardly on the partially coned recess 125 and thus has a wedging action tending to pull the two halves 119 of the detachable die into closed contact with the cylindrical face 115 of the die wheel. By this construction it will be noted that it is only necessary to remove the bolt 127 with the coned washer in order to detach the split die and that replacement dies may be readily attached and securely held in place by bolts and coned washer above mentioned.

In order to vary the tension on the V-shaped belt 44 and to regulate the pulleys 43 (note Figs. 3 and 5), such pulleys are formed in a split construction. A main half section 130 has a hub 131 (note Fig. 5), this being secured to the shaft 41 by a set screw 132, or the like. This hub has an exteriorly threaded end 133 and is provided with an outwardly extending flange 134 having a bevelled surface 135. Threaded on the threaded section 133 of the hub 131 there is a secondary hub 136. This has a bevelled surface 137, which, with the bevelled surface 135 forms an inward taper, such taper terminating at the parallel surfaces 138 and 139 on the main and the secondary hub respectively. These two hub sections are adjusted the correct distance apart by means of an adjusting set screw 140 which is illustrated as threaded through the flange 134 and bears on the flat or plane end 139 of the secondary hub section 136. This adjusting screw may be clamped in place by means of a lock nut 141, it being necessary to provide a groove 142 in the hub 131 to accommodate the wrench to operate the said nut. It is only necessary to provide this screw 140 to space the two halves of the split pulley apart as the direction of rotation of the pulley and the drive on the belt 44 is such that this drive tends to tighten the hub section 136 on the threads 133.

Various changes may be made in the details of construction by those skilled in the art without departing from the spirit or scope of the invention as defined by the appended claims.

I claim:

1. In a device as described, a die wheel having a cylindrical peripheral surface, a die formed in two half sections each substantially semi-cylindrical on its inside surface and each having a plurality of dies thereon to impress fruit, the inside surface of the dies being adapted to contact the cylindrical surface of the die wheel, a hinge structure connecting the two die sections, the end of each die section opposite the hinge having a wedging surface and a screw threaded in the die wheel having a complementary wedging device to engage each die section and clamp such sections in a driving relation with the die wheel.

2. In a device as described, a rotatably mounted die wheel having a circular peripheral surface, a die formed in two half sections, each half section having a substantially semi-circular inner surface to contact with the periphery of the die wheel, a link structure forming a hinge connection between two adjacent ends of the die, the opposite ends of the die having each a partially coned wedging surface, a screw threaded radially in the die wheel and having a washer thereon, the washer having a complementary conical under surface to engage with the semi-coned surfaces of the sections of the die to thereby clamp the die sections on the periphery of the die wheel.

3. In a device as claimed in claim 2, the die wheel having a plurality of studs with heads extending beyond its cylindrical surface, each of the dies having a socket on its undersurface, each to engage a head of a stud and thereby prevent the die being forced laterally off the peripheral surface of the die wheel.

4. In a device as described, a die wheel having a narrow cylindrical peripheral surface, a die formed in a plurality of sections, each having a complementary curvature to that of the die wheel on its inner surface to form a close contact with the surface of the die wheel, a hinged connection between each of the dies except the two free ends of the dies, an attachment means forming a wedging connection between the free ends of the dies and the die wheel, and means interengaging the dies and the die wheel to prevent the dies being forced laterally off the die wheel.

PERLE EVERETT TARLTON.